United States Patent [19]

Bour

[11] 3,962,952

[45] June 15, 1976

[54] AUTOMATIC MILLING SLIDE CONTROL

[75] Inventor: George Carl Bour, Holly, Mich.

[73] Assignee: The Valeron Corporation, Detroit, Mich.

[22] Filed: May 28, 1974

[21] Appl. No.: 473,441

[52] U.S. Cl. .................................. 90/11 A; 90/15 R
[51] Int. Cl.² ........................................ B23C 1/027
[58] Field of Search ............... 82/21 A, 21 B, 34 B; 90/16, 11E, 14, 15; 408/62, 14

[56] References Cited
UNITED STATES PATENTS

| | | | |
|---|---|---|---|
| 2,687,663 | 8/1954 | Uth | 82/21 |
| 2,982,185 | 5/1961 | Engel | 90/16 |
| 3,250,180 | 2/1964 | Eitlhuber | 90/16 |
| 3,259,002 | 7/1966 | Huff et al. | 408/62 X |
| 3,301,106 | 1/1967 | Le Brusque | 82/21 |
| 3,457,833 | 7/1969 | Sedgwick | 90/16 |
| 3,540,346 | 11/1970 | Jones | 90/11 |
| 3,665,805 | 5/1972 | Wolf | 90/15 X |

*Primary Examiner*—Othell M. Simpson
*Assistant Examiner*—W. R. Briggs
*Attorney, Agent, or Firm*—Farley, Forster and Farley

[57] ABSTRACT

Automatically adjustable stop for establishing limit of hydraulically powered axial advance for a milling spindle head with positive means for holding the spindle in fixed advance position during the milling operation along a plane normal to the spindle axis and with automatic gauging means for determining need for adjustment of stop position and gauge responsive means for automatically effecting such adjustment in the stop position while the spindle head is retracted from operating position.

7 Claims, 7 Drawing Figures

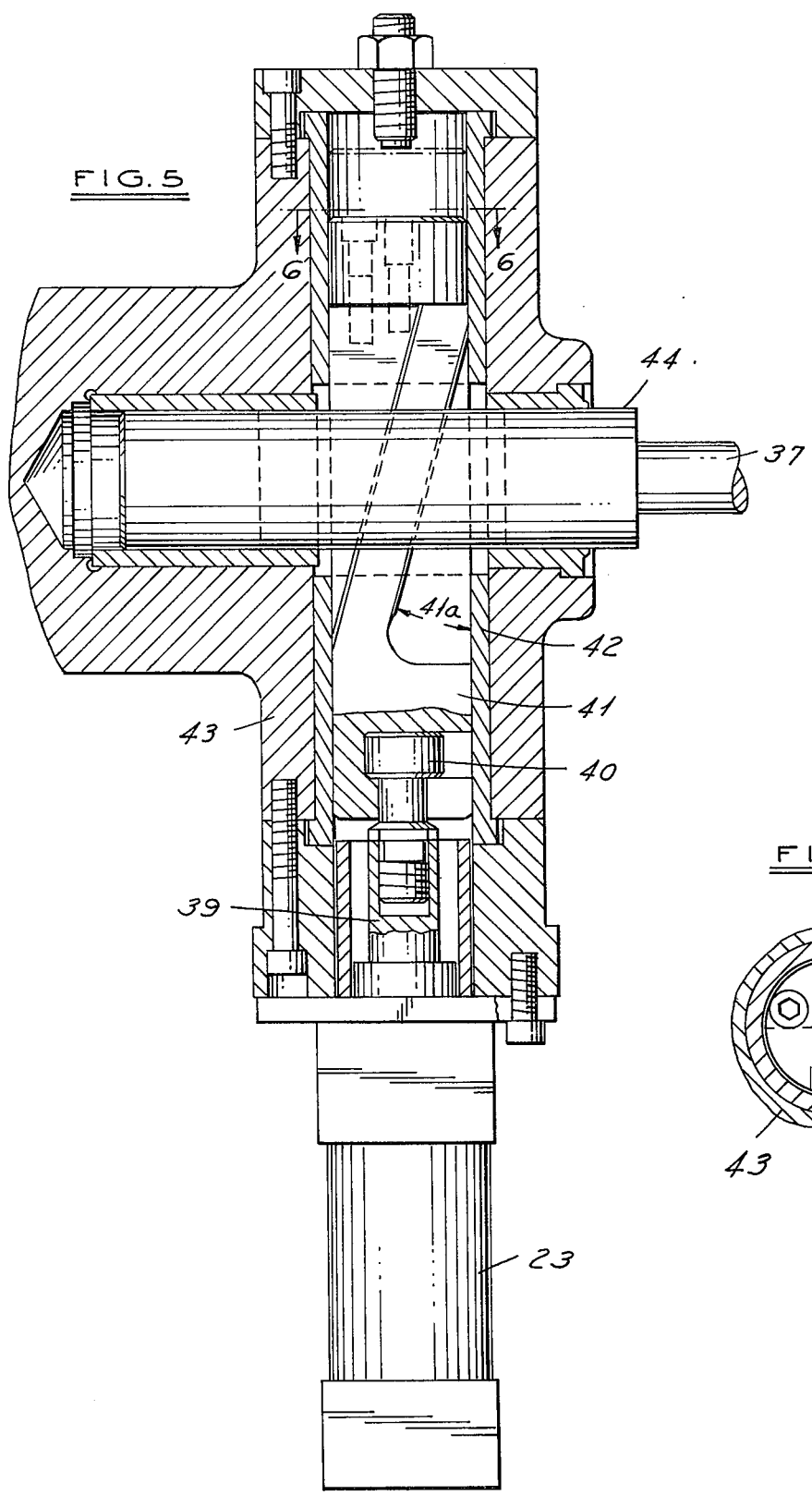

AUTOMATIC MILLING SLIDE CONTROL

BACKGROUND OF THE INVENTION

Conventional systems for automatic positioning of milling spindles operate on the principle of precision feed screws for positioning the spindle relative to a predetermined reference. Means are frequently employed for oscillating the table and spindle head about the zero line with successively slower feeds until they stop within precise position limits determined by the measuring system. Several seconds may be involved in hunting for the required precise position. The prior art also includes manually adjusted gauge blocks or stops against which a slide may be positioned by hydraulic or other means to establish the cutting plane of the milling spindle. The former controls are convenient for tape or other numerically controlled settings but normally do not incorporate automatic work piece gauging and responsive controls for adjusting the spindle to compensate for part size deviations of successive work pieces. The latter manually set stops likewise do not accomplish an automatic adjustment such as to compensate for tool wear, depth of cut as established by gauging of successive oncoming work pieces, or other requirements for automatic compensation.

SUMMARY OF THE PRESENT INVENTION

The present control system provides an automatic means for establishing a positive stop with adjustment of setting while the milling spindle is in a retract portion of its cycle so that the time expended in effecting precision adjustment does not delay the productive machining portion of the time cycle; and also so as to reduce the mass of the equipment components which must be accurately adjusted to that of the relatively small limit stop rather than the weight of the entire operating milling spindle head assembly. In a preferred embodiment one end of a simple centrally pivoted stop arm engages a stop button which is adjusted during a free unloaded condition by an accurate adjustment feed screw which may be incrementally adjusted with any desired degree of fineness of incremental steps through an electrical stepping motor responsive to pre- or post-part gauging mechanism preferably of a variable transducer type providing a positive or negative signal proportional to part size deviation on either side of a predetermined nominal reference. The other end of the pivoted positive stop arm is engaged by a stop member rigidly associated with the spindle head which is advanced by hydraulic cylinder means through a cross wedge mechanism where the spindle head is positively retained during the machining portion of the cycle.

This system provides the potential for accuracy and rapidity of spindle head positioning to closer limits in substantially less time than possible where final adjustment of the relatively massive spindle head assembly is accomplished directly by adjustment feed screw means. The higher speed of advance of the spindle head to its final operating position is accommodated by the prepositioning of the stop and elimination of any "hunting" for precise location.

DESCRIPTION OF THE DRAWINGS

FIG. 1a is a schematic diagram of the cycle path of the milling spindle head;

FIG. 5 is a sectional plan view taken along the line 5—5 of FIG. 4; and

FIG. 6 is a fragmentary sectional view taken along the line 6—6 of FIG. 5.

With reference to FIG. 1, a workpiece 10 is rigidly clamped by conventional means (not shown) to a pedestal 11 mounted on a horizontal slide 12 on the machine base 13 which also mounts a vertical column 14 on which a vertical slide 15 carries a horizontal milling spindle head assembly 16 driven by an electric motor 17 through V-belt 18 whereby a milling cutter 19 mounted on the spindle head 20 is adapted to mill a vertical surface on the work piece while the slide 15 moves upward through a vertical slide stroke as shown by the arrow 21 in FIG. 1a. At the end of the machining stroke the milling spindle head is retracted to a work clearance position along the line 22 (FIG. 1a) by cylinder 23 acting through a cross slide mechanism, later described in detail in connection with FIGS. 4 and 5, whereupon the vertical slide 15 lowers the milling spindle along the path 24 to its vertical starting position at which time any required compensation adjustment in the locating stop for limiting advance movement is made as next described, and reverse actuation of the cylinder 23 moves the milling head horizontally along the line 25 to its beginning milling position for another machining cycle.

Figure 1:
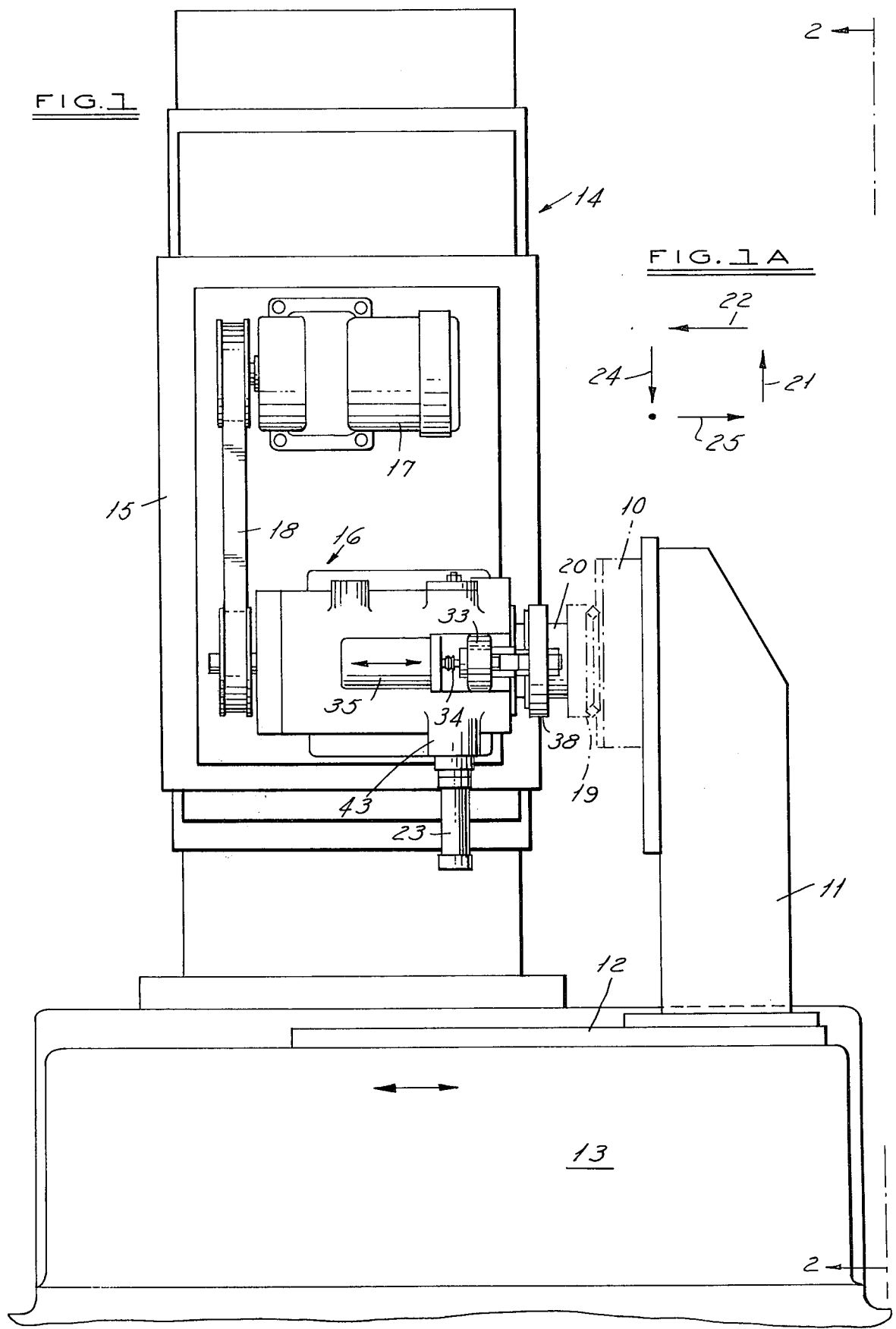
FIG. 1 is a side elevation of a milling machine incorporating a preferred embodiment of the present invention.
Figure 2:
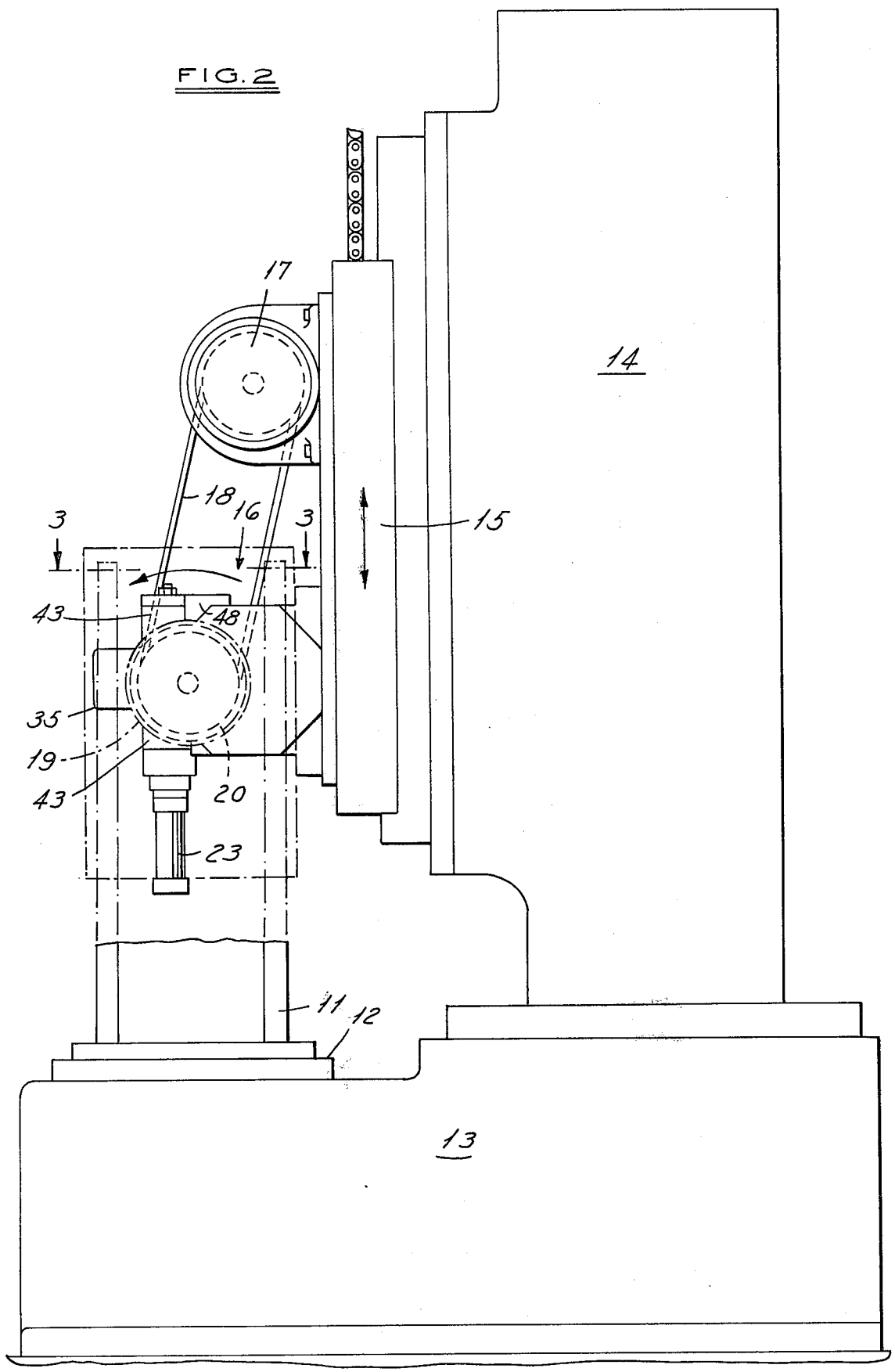
FIG. 2 is an end elevation taken along the line of 2—2 of FIG. 1.
Figure 3:
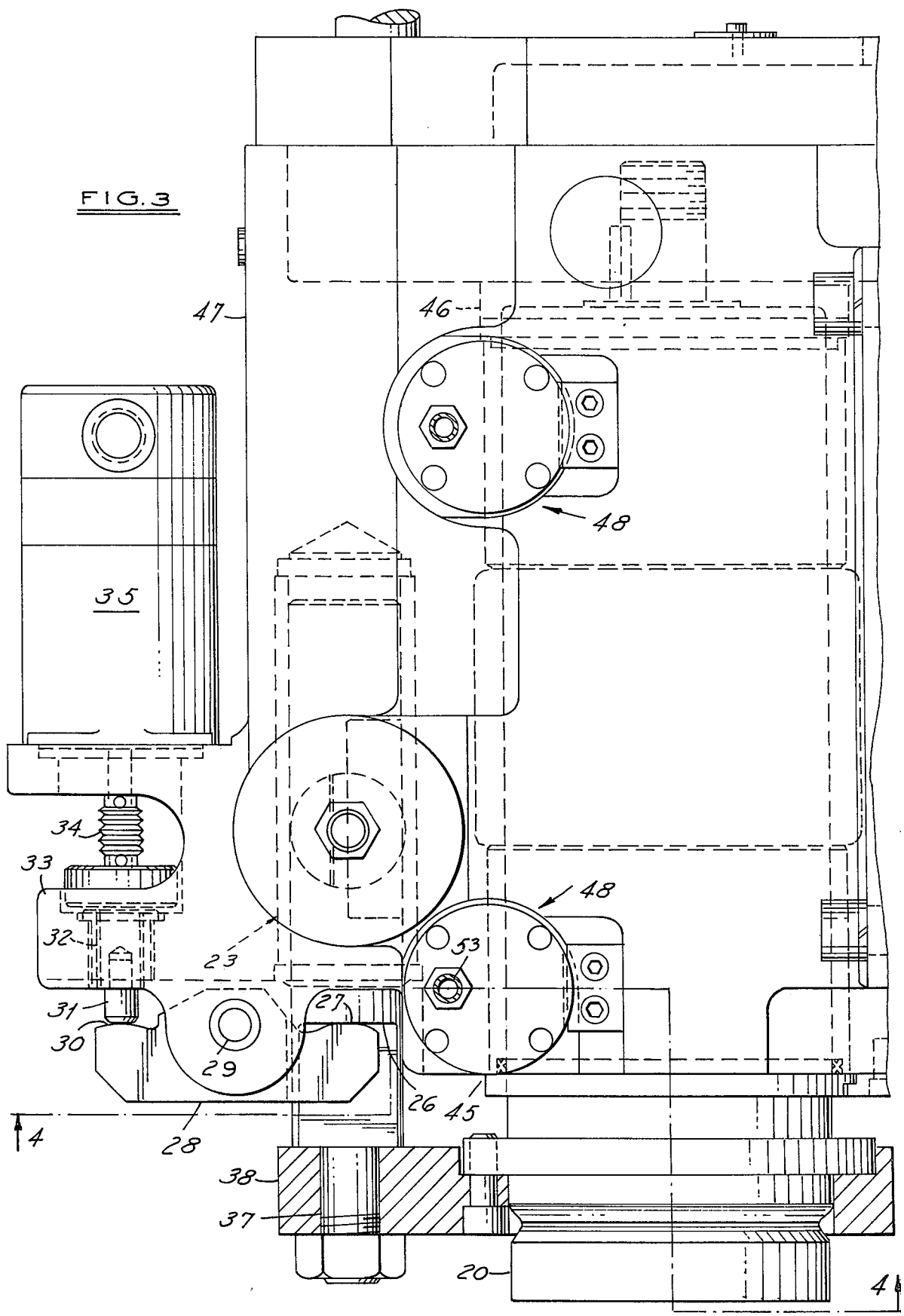
FIG. 3 is an enlarged plan view of the milling spindle head assembly with the adjustment stop positioning mechanism mounted thereon taken along the line 3—3 of FIG. 2, the cutter being omitted.

As best shown in FIG. 3, a precise axial machining position for the milling spindle head is established by engagement of a stop arm 26 rigidly mounted on the spindle housing with the opposing end 27 of a rocker arm 28 pivotally mounted at 29 while the other end of the rocker arm 30 registered against an adjustment stop 31. A fine pitch threaded connection 32 between the adjustment stop 31 and its fixed housing 33, together with a no-backlash bellows coupling 34 from a reversible stepping motor 35 which may have in the order of 200 steps per revolution, provides incremental adjustment for the stop 31 within any predetermined degree of precision required. Since any adjustment takes place with the rocker arm 28 in unloaded condition, only the mass of the adjustable stop 31 and friction of the threaded connection in its housing is involved in making a precision adjustment; and since the remaining linkage of the stop system through the rocker arm 28, pivotal connection 29, stop surfaces 26 and 27 takes place under repetitive equal loading of such linkage each time the spindle is advanced to its operating position, precision adjustment of the stop 31 is reflected in substantially equal precision adjustment of the operating position of the spindle head each time it is advanced to its operating position. Furthermore, since the precision adjustment of the stop 31 takes place during a retract portion of the cycle and independently of the spindle head retract position, no time is lost in moving the relatively massive spindle head with precise axial adjustment mechanism to a very gradual final feed or in hunting through a zero or "nul-balance" position relative to a numerical control gauge signal, to achieve accuracy in the adjustment of final positioning of the spindle head as in the case in prior art adjustment systems adapted for automatic or other numerical controls. Thus the only requirement limiting the speed of advance of the spindle head to its operative machining position is to avoid damaging impact on the stop adjusting threads 32 which may be readily accomplished through conventional rate controls in the operation of the hydraulic cylinder 23.

State of the art gauging controls for example, such as disclosed in U.S. Pat. No. 3,740,161 may be readily adapted by those skilled in the art to incrementally actuate the stepping motor 35 in response to and, if desired, proportionally with part size deviation from any nominal reference which may be established. Such part gauging may be either pre or post machining depending upon the accuracy requirements of the work piece. Thus, pregauging might be employed where an accurate dimensional relationship is desired between the surface to be milled and a previously machined surface whereas post gauging might be employed to effect compensating adjustment for tool wear or other variables affecting accuracy in the effective location on the milling surface to be compensated on a piece-to-piece or periodic gauging basis. The stepping motor lends itself to numerous different modes of control. For example, in a post gauging system a stepping increment may be designed only slightly greater than maximum rate of piece-to-piece tool wear with amplification of a variable transducer plus or minus voltage signal adapted to produce a single plus or minus step in response to virtually every gauging operation. Such system is simple in eliminating any fine adjustment of limit controls relative to acceptable tolerance values and is effective to maintain machining accuracy substantially within the machine's scatterband range of piece-to-piece dimensional deviation other than due to tool wear and independent of adjustment inaccuracies.

Another approach is to provide still finer stepping increments with control means for producing a number of steps proportional to part size deviation. The latter system may be particularly useful where substantial adjustment may be required in providing an accurate dimensional relationship with a previously machined surface. It will be understood that the particular known means of gauging and manner of adaptation within the skill of the art to incrementally drive the stepping motor 35 is outside of the scope of this invention and therefore not disclosed in specific detail.

Figure 4:
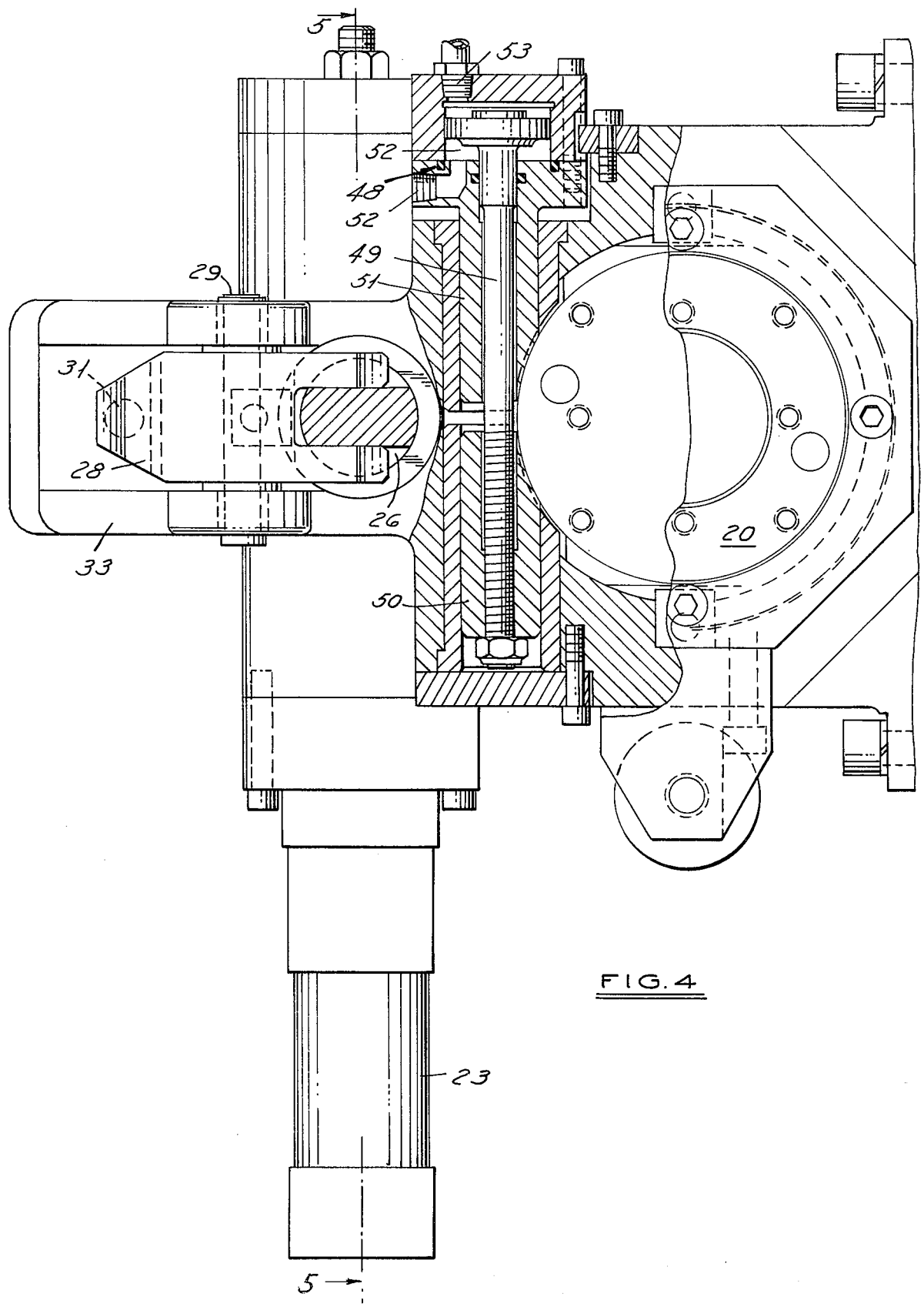
FIG. 4 is an end elevation partially sectioned along the line 4—4 of FIG. 3.

The cylinder 23 is adapted to actuate the rod 37 and the yoke 38 for axially positioning the spindle head 20 with a right angle cross slide drive as shown in FIGS. 4 and 5. The piston rod 39 is coupled by a headed rod end 40 to a wedge shaft 41 slidable in bushing 42 in housing 43 and is adapted to actuate a cross wedge shaft 44 coupled by extension 37 to yoke 38 rigidly clamped to the spindle 20 mounted for axial translation within spindle bushings 45 and 46 mounted in spindle housing 47. A wedge angle 41a as shown in FIG. 5 is equal or close to a self-locking angle and is sufficient to hold the spindle in fixed axial position for many light and medium milling operations. However, for heavy milling or maximum rigidity the spindle may be rigidly clamped in its advanced position. As shown in FIGS. 3 and 4 each of a pair of spindle locks 48 is actuated by a clamp shaft 49 having one end threaded in a clamp element 50 while a second clamp element 51 actuated by a fluid pressure in chamber 52 completes the clamping action when hydraulic pressure is introduced through port 52, the clamp being released by hydraulic pressure introduced at port 53.

Operation

In light of the foregoing description the operation of the control system may be summarized by describing a typical cycle. Each work piece 10 of a given run is suitably clamped to pedestal 11 initially set for each run of work pieces with pedestal movement on slide 12. During each run adjustment is made for each individual work piece while the milling spindle head is in retracted position in the case of either pre or post gauging of the work piece to establish the required axial operating position of the milling spindle head. The required adjustment signal responsive to the gauging operation causes suitable electrical controls known in the art to actuate the stepper motor 35 incrementally in either direction to effect through rotation of the bellows coupling 34 and feed screw 32 accurate positioning of the adjustment stop 31 engaged by one end 30 of the rocker arm 19. Upon actuation of the cylinder 23 to advance the spindle head its operating position is established by engagement of the stop surface 26 with the other end 27 of the rocker arm 28 at which position all clearance in the adjustment linkage is taken up with compressive loading of the contact surfaces established by controlled hydraulic pressure in the cylinder 23 assuring positive axial positioning of the spindle 20 in accordance with the adjusted position of the stop 31. While positively positioned, the spindle head cylinder piloted in bushings 45 and 46 is clamped in axial fixed position by actuation of each clamp shaft 49.

The milling operation next takes place through actuation of the vertical slide 15 on column 14 at the end of which the spindle locks are released by pressurizing the piston end of the clamp shafts 49 through ports 53 and the milling spindle is retracted by reverse actuation of the hydraulic cylinder 23. The vertical slide 15 next returns the milling spindle to its horizontal starting position at which time an engaging and compensation adjustment of the stop 31 again takes place before the next cycle of operation begins.

As previously mentioned, the spindle clamps may not be required for all operations; for example, in the case of light to medium milling where the hydraulic pressure acting through the self locking cross wedges provide a sufficiently rigid structure to hold the milling spindle in fixed axial position throughout the milling operation. In some light milling cases the self locking cross wedges may also be dispensed with depending on direct cylinder loading of the yoke sufficiently preloading the stop mechanism to resist cutting pressure displacement.

I claim:

1. A machine spindle position control system for accurately adjusting from work piece to work piece the effective spindle head axial position and face cutting plane of a cutter comprising;
   a spindle head assembly mounted on a machine,
   bearings in said assembly supporting the said spindle head for axial movement,
   adjustable positive stop means coacting with an abutment surface rigidly associated with said axially displaceable spindle, said adjustable positive stop means being actuatable to establish the limit of spindle head advance to an effective fixed operating position preparatory to starting a machining operation on a given work piece, actuating means for axial advancing and retracting of said spindle head, and maintaining said spindle in advanced position established by said stop means, and means for adjusting said positive stop position, during retraction of and preparatory to advancing said spindle head axially for successive machining operations on successive work pieces.

2. A machining spindle control system as set forth in claim 1 including means for retaining said spindle head in fixed axial position during machining of the work piece.

3. A machining spindle control system as set forth in claim 1 including means for retaining said spindle head in fixed axial position during machining of the work piece, said last means comprising hydraulic cylinder and mechanical linkage having substantial mechanical advantage adapted to retain said spindle head in fixed position against axial cutting pressures.

4. A machining spindle control system as set forth in claim 1 including means for retaining said spindle head in fixed axial position during machining of the work piece, said last means including friction clamp means adapted to positively clamp said spindle head against axial displacement.

5. A machining spindle control system as set forth in claim 1 wherein said stop means includes a pivoted arm link, an adjustable stop for limiting the travel of one end of said link and a member rigidly associated with said axially displaceable spindle head engaging the other end of said link to move the pivotal arm against said adjustable stop at the end of the advance of said spindle head to operating position.

6. A machining spindle control system as set forth in claim 5 including a stepping motor drivingly connected to adjust said adjustable stop position in predetermined incremental steps.

7. A machining spindle control system as set forth in claim 1 wherein said actuating means comprises a fluid pressure actuated piston, a cam slide actuated in direct linear relation by said piston and a yoke arm transversely engaging said cam slide establishing transverse linear reciprocating motion upon reciprocation of said piston, and a driving connection in direct linear relation from said yoke arm to said spindle head.

* * * * *